United States Patent
Poon et al.

(10) Patent No.: US 10,069,663 B1
(45) Date of Patent: Sep. 4, 2018

(54) SYSTEM AND METHOD FOR DEVICE CHARACTERIZATION

(71) Applicant: Xilinx, Inc., San Jose, CA (US)

(72) Inventors: Leo Kar Leung Poon, San Jose, CA (US); David L. Ferguson, Singapore (SG)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 15/634,587

(22) Filed: Jun. 27, 2017

(51) Int. Cl.
*H04B 1/16* (2006.01)
*H04L 25/49* (2006.01)
*H04B 17/29* (2015.01)

(52) U.S. Cl.
CPC .......... *H04L 25/4917* (2013.01); *H04B 1/16* (2013.01); *H04B 17/29* (2015.01)

(58) Field of Classification Search
CPC ........ H04L 25/4917; H04B 1/16; H04B 17/29
See application file for complete search history.

(56) References Cited

U.S. PATENT DOCUMENTS

| | | | |
|---|---|---|---|
| 5,305,384 A | 4/1994 | Ashby et al. | |
| 6,031,428 A | 2/2000 | Hill | |
| 7,505,541 B1 | 3/2009 | Brunn et al. | |
| 2007/0001704 A1* | 1/2007 | O'Mahony | H04L 25/0278 324/750.3 |
| 2011/0311008 A1* | 12/2011 | Slezak | H03M 9/00 375/353 |
| 2013/0195155 A1* | 8/2013 | Pan | H03D 1/00 375/219 |
| 2013/0241622 A1* | 9/2013 | Zerbe | G11C 7/02 327/323 |

* cited by examiner

*Primary Examiner* — Dac Ha
(74) *Attorney, Agent, or Firm* — David O'Brien; Carleton Clauss

(57) ABSTRACT

A characterization system includes a signal detector. The signal detector includes a first conversion unit configured to receive, from a first device, a first device output signal including N possible discrete pulse amplitudes and generate a plurality of detected signals based on a plurality of threshold amplitudes respectively. The signal detector further includes a second conversion unit configured to generate a first conversion output signal and a second conversion output signal based on logic values included in the plurality of detected signals and provide first and second conversion output signals to an analysis unit for generating one or more measurements of the first device. The first and second conversion output signals include M1 and M2 possible discrete pulse amplitudes respectively. M1 and M2 are integers less than N.

18 Claims, 11 Drawing Sheets

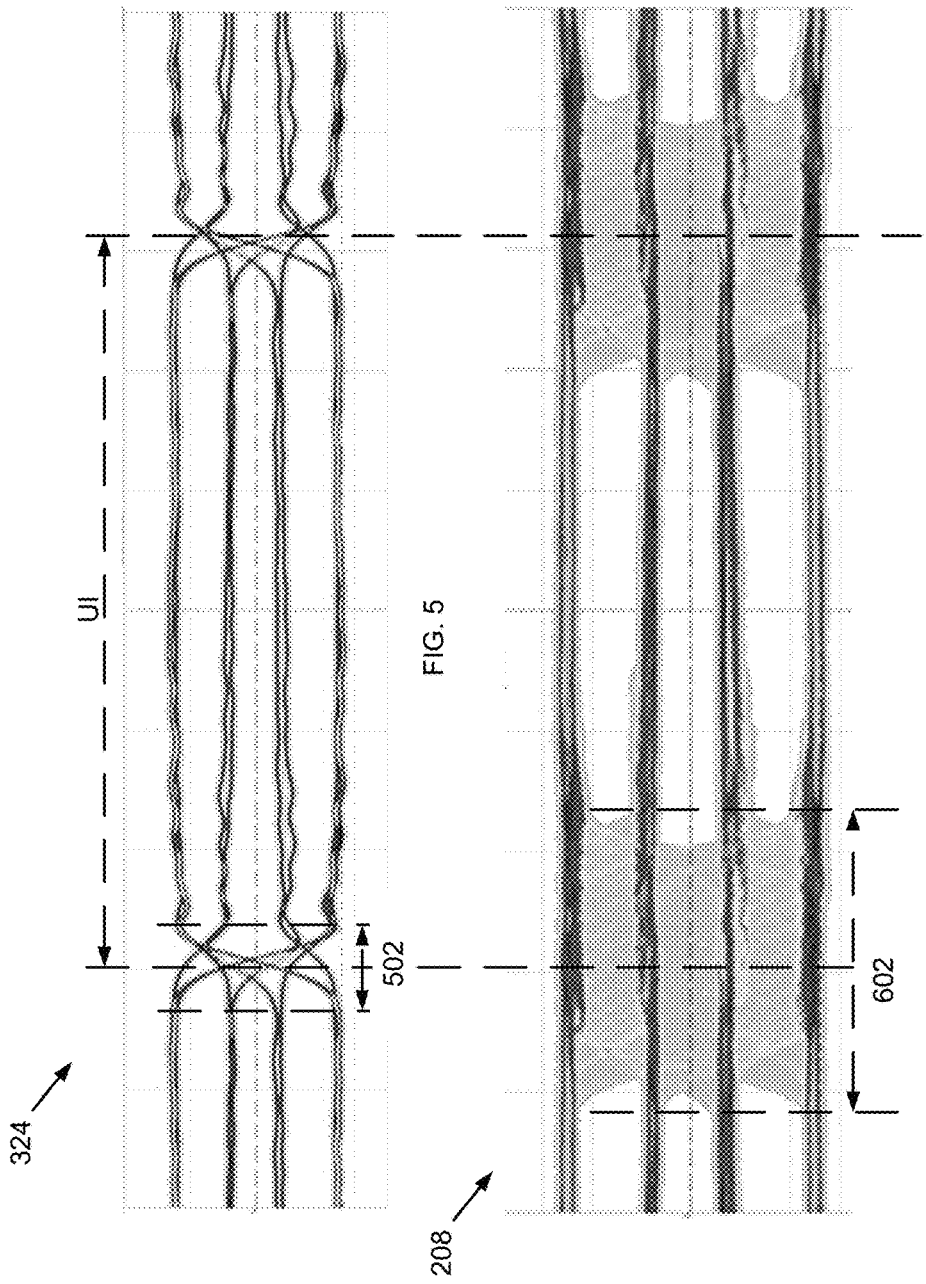

| 318 | 320 | 208 | Output of 702 |||||||| AN1 | AN2 | AN3 |
|-----|-----|-----|----|----|----|----|----|----|----|-----|-----|-----|
|     | (LSB) | PAM-8 | D1 | D2 | D3 | D4 | D5 | D6 | D7 | (MSB) |   | (LSB) |
| 00 | 0 | 000 | 0 | 0 | 0 | 0 | 0 | 0 | 0 | 0 | 0 | 0 | ← 1202 |
| 00 | 1 | 001 | 0 | 0 | 0 | 0 | 0 | 0 | 1 | 0 | 0 | 1 | ← 1204 |
| 01 | 0 | 010 | 0 | 0 | 0 | 0 | 0 | 1 | 1 | 0 | 1 | 0 | ← 1206 |
| 01 | 1 | 011 | 0 | 0 | 0 | 0 | 1 | 1 | 1 | 0 | 1 | 1 | ← 1208 |
| 10 | 0 | 100 | 0 | 0 | 0 | 1 | 1 | 1 | 1 | 1 | 0 | 0 | ← 1210 |
| 10 | 1 | 101 | 0 | 0 | 1 | 1 | 1 | 1 | 1 | 1 | 0 | 1 | ← 1212 |
| 11 | 0 | 110 | 0 | 1 | 1 | 1 | 1 | 1 | 1 | 1 | 1 | 0 | ← 1214 |
| 11 | 1 | 111 | 1 | 1 | 1 | 1 | 1 | 1 | 1 | 1 | 1 | 1 | ← 1216 |

FIG. 12

SYSTEM AND METHOD FOR DEVICE CHARACTERIZATION

FIELD

Examples of the present disclosure generally relate to integrated circuits (ICs) and, in particular, to an embodiment related to a characterization system.

BACKGROUND

Communication systems including high-speed transceivers are used to communicate data between devices. The data rate requirements of such communication systems continue to increase as technology advances. As a signal is transmitted, an encoding scheme for symbols in the signal may be employed. An example of an encoding scheme is a 2-level PAM (PAM-2) scheme, which is also referred to as a non-return-to-zero (NRZ) scheme. For the NRZ scheme, the signal may include two possible discrete pulse amplitudes. A transmit symbol may have one of two different values (e.g., with normalized amplitude levels of +1 and −1), which may be represented using a single bit. As data rates increase to meet demand for higher data throughput, multi-bit symbols based on various encoding schemes (e.g., PAM-N, where N is an integer greater than two) may be used. For the PAM-4 scheme, the signal may include four possible discrete pulse amplitudes, and a transmit symbol may have one of four different values (e.g., with normalized amplitude levels of −3, −1, +1, and +3), which may be represented using two bits. While using multi-bit symbols based on encoding schemes such as PAM-4 may increase data rates and bandwidth efficiency, testing and measuring PAM-N signals including multi-bit symbols may be challenging and expensive.

Accordingly, it would be desirable and useful to provide an improved way of characterizing devices that transmit multi-bit symbols based on encoding schemes such as PAM-4.

SUMMARY

In some embodiments in accordance with the present disclosure, a characterization system includes a signal detector. The signal detector includes a first conversion unit configured to receive, from a first device, a first device output signal including N possible discrete pulse amplitudes and generate a plurality of detected signals based on a plurality of threshold amplitudes respectively. The signal detector further includes a second conversion unit configured to generate a first conversion output signal and a second conversion output signal based on logic values included in the plurality of detected signals and provide first and second conversion output signals to an analysis unit for generating one or more measurements of the first device. The first and second conversion output signals include M1 and M2 possible discrete pulse amplitudes respectively. M1 and M2 are integers less than N.

In some embodiments, the second conversion unit includes a validation unit configured to generate an error indication signal indicating an error status of a combination of the logic values included in the plurality of detected signals. The second conversion unit is configured to provide the error indication signal to the analysis unit.

In some embodiments, the first conversion unit includes a first decoder configured to receive the first device output signal and a first threshold amplitude and generate a first detected signal; a second decoder configured to receive the first device output signal and a second threshold amplitude and generate a second detected signal; and a third decoder configured to receive the first device output signal and a third threshold amplitude and generate a third detected signal.

In some embodiments, the signal detector is configured to have a first termination impedance matching a second termination impedance of the first device.

In some embodiments, the first decoder includes a resistor calibration circuit configured to adjust a third termination resistance of the first decoder based on the second termination impedance.

In some embodiments, the characterization system includes a signal generator configured to provide, to the first device, a first device input signal including the N possible discrete pulse amplitudes. The signal generator includes a first sub-generator configured to generate a first sub-generator output signal including M3 possible discrete pulse amplitudes; a second sub-generator configured to generate a second sub-generator output signal including M4 possible discrete pulse amplitudes; and a combiner configured to receive the first and second sub-generator output signals and generate the first device input signal. N is equal to or greater than a product of M3 and M4.

In some embodiments, the first sub-generator, the second sub-generator, the first decoder, the second decoder, and the third decoder are located in a first die, a second die, a third die, a fourth die, and a fifth die respectively.

In some embodiments, M3 is greater than M4.

In some embodiments, the first sub-generator includes a first delay unit. The first sub-generator output signal has a first amplitude weight. The second sub-generator includes a second delay unit. The second sub-generator output signal has a second amplitude weight. The first and second delay units and first and second amplitude weights are configured according to predetermined measurement conditions for the one or more measurements of the first device.

In some embodiments, the signal detector is configured to provide the first conversion output signal to a first analyzer included in the analysis unit, wherein the first analyzer is configured to perform a first analysis process to generate a first measurement of the first device; and provide the second conversion output signal to a second analyzer included in the analysis unit, wherein the second analyzer is configured to perform a second analysis process to generate a second measurement of the first device.

In some embodiments, a method includes receiving, by a signal detector from a first device, a first device output signal including N possible discrete pulse amplitudes, N being an integer equal to or greater than four; generate a plurality of detected signals based on the first device output signal and a plurality of threshold amplitudes respectively; generating a first conversion output signal and a second conversion output signal based on logic values included in the plurality of detected signals, wherein the first and second conversion output signal include M1 and M2 possible discrete pulse amplitudes respectively, M1 and M2 being integers less than N; and providing, by the signal detector to an analysis unit, the first and second conversion output signals, wherein the analysis unit generates one or more measurements of the first device using the first conversion output signal and a second conversion output.

In some embodiments, the method includes generating an error indication signal indicating an error status of a combination of the logic values included in the plurality of detected signals; and providing the error indication signal to the analysis unit.

In some embodiments, the method includes generating, by a first decoder included in the signal detector, a first detected signal using the first device output signal and a first threshold amplitude; generating, by a second decoder included in the signal detector, a second detected signal using the first device output signal and a second threshold amplitude; and generating, by a third decoder included in the signal detector, a third detected signal using the first device output signal and a third threshold amplitude.

In some embodiments, the method includes configuring a first termination impedance of the signal detector such that the first termination impedance matches a second termination impedance of the first device.

In some embodiments, the method includes the configuring the first termination impedance of the signal detector includes: configuring a third termination resistance of the first decoder using a resistor calibration circuit included in the first decoder.

In some embodiments, the method includes generating, by a first sub-generator, a first sub-generator output signal including M3 possible discrete pulse amplitudes; generating, by a second sub-generator, a second sub-generator output signal including M4 possible discrete pulse amplitudes; generating a first device input signal including the N possible discrete pulse amplitudes by performing a power summation to the first and second sub-generator output signals; and providing the first device input signal to the first device. N is an integer equal to or greater than a product of M3 and M4.

In some embodiments, M1 equals M3, and M2 equals M4.

In some embodiments, the method includes configuring a first amplitude weight of the first sub-generator output signal and a second amplitude weight of the second sub-generator output signal according to predetermined measurement conditions for the one or more measurements of the first device.

In some embodiments, the method includes prior to providing the first device input signal to the first device, injecting a predetermined jitter to the first device input signal.

In some embodiments, the method includes providing the first conversion output signal to a first analyzer included in the analysis unit, wherein the first analyzer is configured to perform a first analysis process to generate a first measurement of the first device; and providing the second conversion output signal to a second analyzer included in the analysis unit, wherein the second analyzer is configured to perform a second analysis process to generate a second measurement of the first device.

Other aspects and features will be evident from reading the following detailed description and accompanying drawings.

BRIEF DESCRIPTION OF THE DRAWINGS

FIG. 5 is a diagram illustrating an eye diagram of signals of a signal generator according to some embodiments of the present disclosure.

FIG. 6 is diagram illustrating an eye diagram signals of a signal generator according to some embodiments of the present disclosure.

FIG. 12 illustrates a truth table for signals of a characterization system according to some embodiments of the present disclosure.

DETAILED DESCRIPTION

Figure 1:
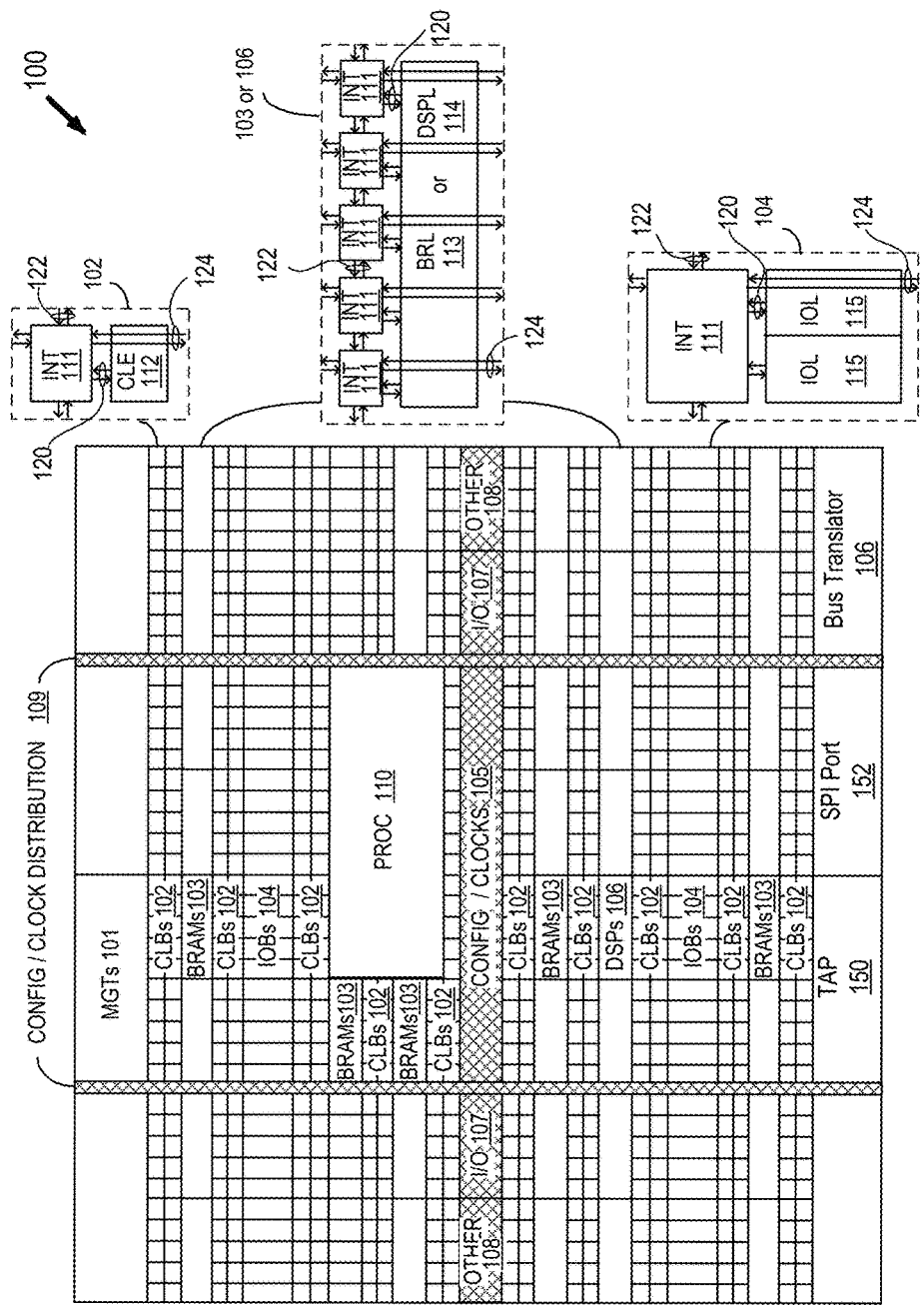
FIG. 1 is a block diagram illustrating an exemplary architecture for an IC according to some embodiments of the present disclosure.

Various embodiments are described hereinafter with reference to the figures, in which exemplary embodiments are shown. The claimed invention may, however, be embodied in different forms and should not be construed as being limited to the embodiments set forth herein. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described. The features, functions, and advantages may be achieved independently in various embodiments or may be combined in yet other embodiments.

Before describing exemplary embodiments illustratively depicted in the several figures, a general introduction is provided to further understanding. As demands for the speed increase, multi-bit symbols based on various encoding schemes (e.g., PAM-4) may be used to increase data rates and improve bandwidth efficiency. However, testing and measuring signals including those multi-bit symbols may be challenging and expensive. For integrated circuit (IC) solutions, it has been discovered that signal generators (e.g., NRZ transmitters) for single-bit symbols may be used to generate signals including multi-bit symbols. Further, decoders (e.g., NRZ receivers) for single-bit symbols may be used to analyze signals including multi-bit symbols. As such, because NRZ transmitters and receivers are available at a lower cost, transceivers for multi-bit symbols may be tested and characterized at a lower cost.

With the above general understanding borne in mind, various embodiments for device characterization are generally described below. Because one or more of the above-described embodiments are exemplified using a particular type of IC, a detailed description of such an IC is provided below. However, it should be understood that other types of ICs may benefit from one or more of the embodiments described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device (CPLD). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

In general, each of these programmable logic devices ("PLDs"), the functionality of the device is controlled by configuration data provided to the device for that purpose. The configuration data can be stored in volatile memory (e.g., static memory cells, as common in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

As noted above, advanced FPGAs can include several different types of programmable logic blocks in the array. For example, FIG. 1 illustrates an exemplary FPGA architecture 100. The FPGA architecture 100 includes a large number of different programmable tiles, including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile can include at least one programmable interconnect element ("INT") 111 having connections to input and output terminals 120 of a programmable logic element within the same tile, as shown by examples included at the top of FIG. 1. Each programmable interconnect element 111 can also include connections to interconnect segments 122 of adjacent programmable interconnect element(s) in the same tile or other tile(s). Each programmable interconnect element 111 can also include connections to interconnect segments 124 of general routing resources between logic blocks (not shown). The general routing resources can include routing channels between logic blocks (not shown) comprising tracks of interconnect segments (e.g., interconnect segments 124) and switch blocks (not shown) for connecting interconnect segments. The interconnect segments of the general routing resources (e.g., interconnect segments 124) can span one or more logic blocks. The programmable interconnect elements 111 taken together with the general routing resources implement a programmable interconnect structure ("programmable interconnect") for the illustrated FPGA.

In an example implementation, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 106 can include a DSP logic element ("DSPL") 114 in addition to an appropriate number of programmable interconnect elements. An 1OB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the example of FIG. 1, an area (depicted horizontally) near the center of the die (e.g., formed of regions 105, 107, and 108 shown in FIG. 1) can be used for configuration, clock, and other control logic. Column 109 (depicted vertically) extending from this horizontal area or other columns may be used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, PROC 110 spans several columns of CLBs and BRAMs. PROC 110 can include various components ranging from a single microprocessor to a complete programmable processing system of microprocessor(s), memory controllers, peripherals, and the like.

In one aspect, PROC 110 is implemented as a dedicated circuitry, e.g., as a hard-wired processor, that is fabricated as part of the die that implements the programmable circuitry of the IC. PROC 110 can represent any of a variety of different processor types and/or systems ranging in complexity from an individual processor, e.g., a single core capable of executing program code, to an entire processor system having one or more cores, modules, co-processors, interfaces, or the like.

In another aspect, PROC 110 is omitted from architecture 100, and may be replaced with one or more of the other varieties of the programmable blocks described. Further, such blocks can be utilized to form a "soft processor" in that the various blocks of programmable circuitry can be used to form a processor that can execute program code, as is the case with PROC 110.

The phrase "programmable circuitry" can refer to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 1 that are external to PROC 110 such as CLBs 102 and BRAMs 103 can be considered programmable circuitry of the IC.

In some embodiments, the functionality and connectivity of programmable circuitry are not established until configuration data is loaded into the IC. A set of configuration data can be used to program programmable circuitry of an IC such as an FPGA. The configuration data is, in some cases, referred to as a "configuration bitstream." In general, programmable circuitry is not operational or functional without first loading a configuration bitstream into the IC. The configuration bitstream effectively implements or instantiates a particular circuit design within the programmable circuitry. The circuit design specifies, for example, functional aspects of the programmable circuit blocks and physical connectivity among the various programmable circuit blocks.

In some embodiments, circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 110.

In some instances, hardwired circuitry can have one or more operational modes that can be set or selected according to register settings or values stored in one or more memory elements within the IC. The operational modes can be set, for example, through the loading of a configuration bitstream into the IC. Despite this ability, hardwired circuitry is not considered programmable circuitry as the hardwired circuitry is operable and has a particular function when manufactured as part of the IC.

FIG. 1 is intended to illustrate an exemplary architecture that can be used to implement an IC that includes programmable circuitry, e.g., a programmable fabric. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual IC, more than one adjacent row of CLBs is typically included wherever the CLBs appear, to facilitate the efficient implementation of user logic, but the number of adjacent CLB rows varies with the overall size of the IC. Moreover, the FPGA of FIG. 1 illustrates one example of a programmable IC that can employ examples of the interconnect circuits described herein. The interconnect circuits described herein can be used in other types of programmable ICs, such as CPLDs or any type of programmable IC having a programmable interconnect structure for selectively coupling logic elements.

It is noted that the IC that may implement the device characterization is not limited to the exemplary IC depicted in FIG. 1, and that IC having other configurations, or other types of IC, may also implement the device characterization.

Figure 2:
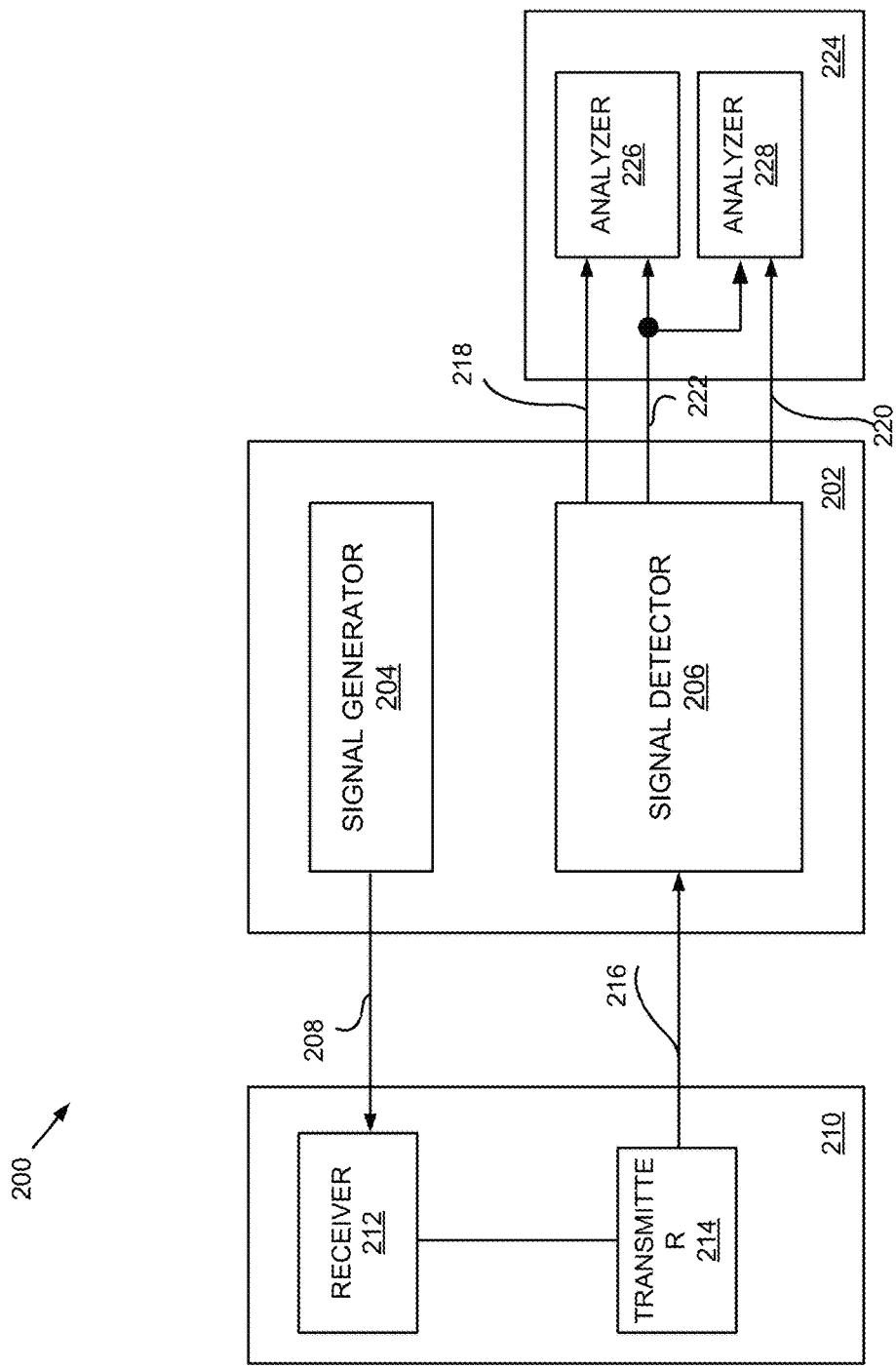
FIG. 2 is a block diagram illustrating an exemplary test system according to some embodiments of the present disclosure.

Referring to FIG. 2 is a block diagram illustrating an exemplary test system 200 for testing a device under test (DUT). A characterization system 202 includes a signal generator 204 and a signal detector 206. The signal generator 204 generates a signal 208. In some embodiments, the signal 208 is a PAM-N signal, where N is an integer greater than two (e.g., N may be 4, 8, 16, or any other suitable number). In other words, the signal 208 may have N possible discrete pulse amplitudes corresponding to the N possible values of a symbol of the signal 208. The signal 208 is provided to an input of the DUT 210, where the DUT 210 uses the PAM-N encoding scheme. The signal 208 may also be referred to as a DUT input signal 208 or a device input signal 208. In the illustrated example, the DUT 210 includes a transceiver including a receiver 212 and a transmitter 214. Alternatively, the DUT 210 may include any device processing PAM-N signals.

In the example of FIG. 2, the receiver 212 sends the received signal 208 to the transmitter 214, which outputs a PAM-N signal 216. The PAM-N signal 216 may also be referred to as a DUT output signal 216 or a device output signal 216. The signal detector 206 receives the DUT output signal 216, and outputs signals 218, 220, and 222. In some embodiments, the signals 218 and 220 include data information transmitted by the DUT 210, and may be referred to as data signals 218 and 220. The signal 222 may include error information indicating whether the symbols included in the data signals 218 and 220 are valid. As such, the signal 222 is referred to as an error indication signal 222 in the discussion below. In an example, the error information of the error indication signal 222 may indicate an error in symbols of the data signals 218 and 220 caused by the signal detector 206. Such an error is referred to as a signal detection error. In such an example, because the signal detection error is not caused by the DUT 210, the analysis unit 224 may not include such signal detection errors in its analysis process (e.g., by skipping the symbols in data signals 218 and 220 that have signal detection errors).

In some embodiments, each of the signals 218, 220, and 222 is an NRZ signal including two possible pulse amplitudes. The signal detector 206 provides the signals 218, 220, and 222 to an analysis unit 224, which may generate various measurements of the DUT 210. The measurements may include performance measurements of the DUT 210 including, for example, transmitter output jitter, transmitter output rise and fall times, bit error rates (BERs) under various signal patterns and noise, receiver stress characterization including receiver input jitter tolerance, and other suitable characteristics of the DUT 210. The analysis unit 224 may include various signal analyzers including, for example, precision waveform analyzers, vector network analyzers, oscilloscopes, serial bit error ratio testers, and other suitable signal analyzers.

In some embodiments, as illustrated in FIG. 2, the analysis unit 224 may include multiple analyzers analyzing the data signals 218 and 220 independently. For example, the analyzer 226 receives the data signal 218, and performs an analysis process to generate a measurement of the DUT 210 based on the data signal 218 without using the data signal 220. For further example, the analyzer 228 receives the data signal 220, and performs an analysis process to generate another measurement of the DUT 210 based on the data signal 220 without using the data signal 218. In some embodiments, the measurements from the analyzers 226 and 228 may be combined to provide a consolidated measurement of the DUT 210.

In some embodiments, the signal detector 206 and analysis unit 224 are used to verify whether the symbols of DUT output signal 216 match the expectation as provided by the design of the DUT 210, and provide a measurement of the accuracy of the DUT output signal 216. For example, the analyzers 226 and 228 may provide BERs associated with the DUT output signal 216.

In some embodiments, the signal detector 206 and analysis unit 224 are used to measure the signal quality of the DUT output signal 216 (e.g., using various parameters of the eye diagram of the DUT output signal 216), which will be described in detail below.

In some embodiments, the data signals 218 and 220 may perform the signal analysis using the error indication signal 222. In an example, the error indication signal 222 indicates a signal detector error in a particular symbol of the data signals 218 and 220. In such examples, because the signal detector 206 (instead of the DUT 210) causes such a signal detector error, the analyzer 226 may not include that particular symbol in the analysis process for providing measurements (e.g., BER) of the DUT 210.

Figure 3:
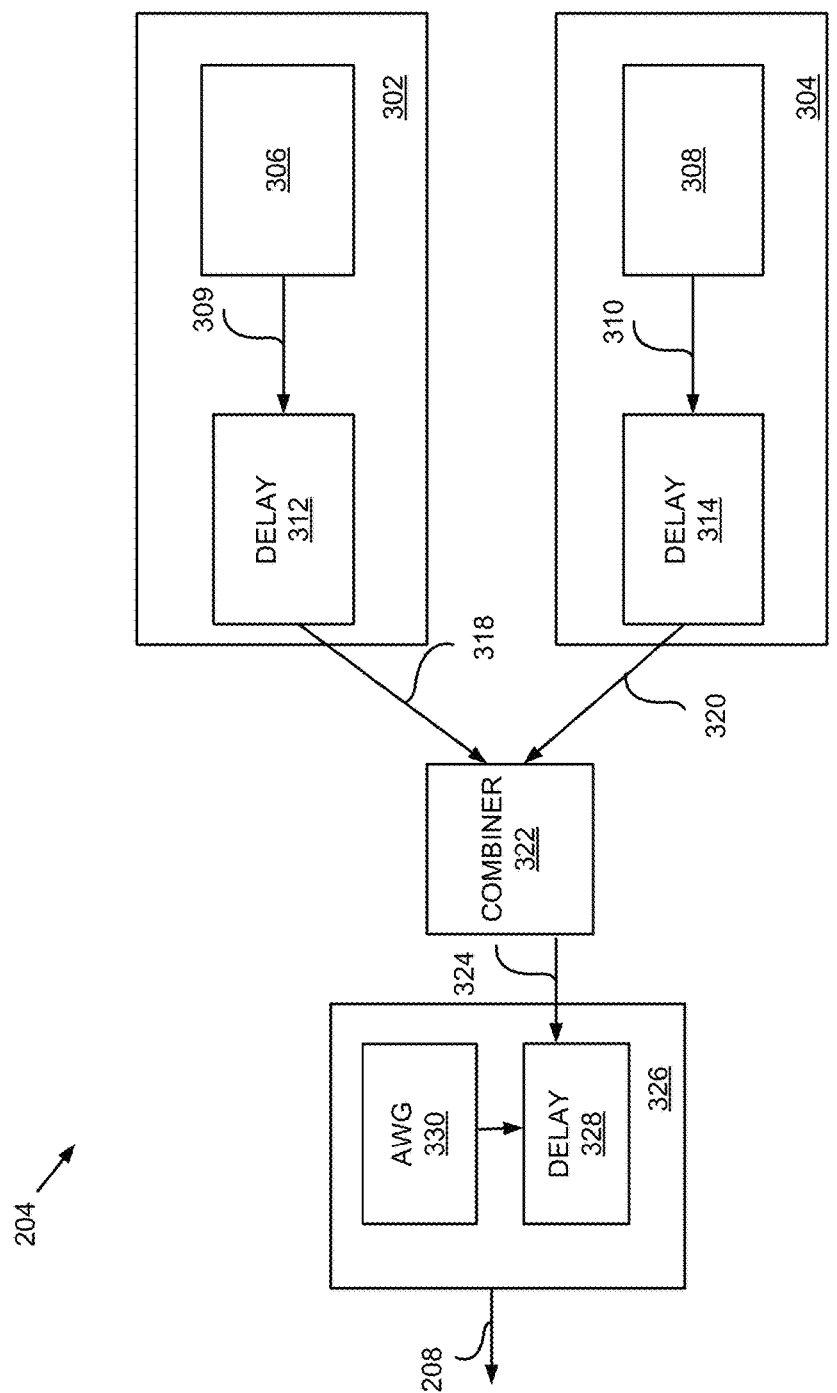
FIG. 3 is a block diagram illustrating an exemplary signal generator of a characterization system according to some embodiments of the present disclosure.

Referring to FIG. 3, illustrated is an exemplary signal generator 204 that generates a PAM-N signal using NRZ signal generators. In the illustrated example, the signal generator includes sub-generators 302 and 304 generating NRZ signals 318 and 320. The sub-generator 302 includes a first generator 306 that generates an NRZ signal 309. Similarly, the sub-generator 304 includes a second generator 308 that generates an NRZ signal 310. In some embodiments, the first generator 306 and second generator 308 are configured so that the amplitudes of the NRZ signals 309 and 310 have a predetermined amplitude ratio. In an embodiment, the NRZ signal 309 corresponds to a most significant bit (MSB) of a PAM-4 signal 208, and the NRZ signal 310 correspond to the least significant bit (LSB) of the PAM-4 signal 208. In an example, the predetermined amplitude ratio between the NRZ signal 309 and NRZ signal 310 is 2:1. In other words, in that example, the NRZ signal 309 has an amplitude weight equal to 0.67, and the NRZ signal 310 has an amplitude weight equal to 0.33. In another example, the predetermined amplitude ratio may be less than 2:1 (e.g., 1.9:1) or greater than 2:1 (e.g., 2.1:1) which may be determined based on predetermined measurement conditions for a particular measurement (e.g., receiver stress characterization, BER) of the DUT 210. By adjusting the amplitude ratio of the signals 309 and 310, the shape of the eye diagram (e.g., eye heights) of the device input signal 208 is changed, which may affect the particular measurement of the DUT 210.

In some embodiments, the absolute values of the amplitudes of the NRZ signals 309 and 310 are controlled (e.g., while keeping the amplitude ratio), such that the device input signal 208 have amplitudes of predetermined values. Such predetermined values may also be determined based on predetermined measurement conditions for a particular measurement of the DUT 210.

In some embodiments, the sub-generators 302 and 304 include delay units 312 and 314 respectively. In an example, the delay units 312 and 314 may de-skew the signals 309 and 310 such that the resulting signals 318 and 320 are aligned. In another example, the delay units 312 and 314 may apply different delays to the signals 309 and 310, such that the resulting signals 318 and 320 have a predetermined delay relationship. Such a predetermined delay relationship may be determined based on predetermined measurement conditions for a particular measurement (e.g., receiver stress characterization) of the DUT 210.

In some embodiments, the sub-generators 302 and 304 are located on different dies. For example, the sub-generators 302 and 304 are NRZ transmitters located in different dies. In an example, the delay unit 312 may be a transmitter phase interpolator of the NRZ transmitter 302, and is located on the same die as the first generator 306. However, in another example, the delay unit 312 and the first generator 306 may be located in different dies, and the delay unit 314 and the second generator 308 may be located in different dies.

In some embodiments, signals 318 and 320 are sent to a power combiner 322, which may perform a power sum of signals 318 and 320 and generate a signal 324. Because the delay units 312 and 314 do not change the amplitudes of the signals, the signals 318 and 320 have the same amplitude ratio as that of signals 309 and 310. In an example where signals 318 and 320 are NRZ signals with a predetermined amplitude ratio, the signal 324 is a PAM-4 signal including four possible discrete pulse amplitudes.

In the example of FIG. 3, the signal 324 is sent to a jitter injection unit 326, which injects jitter to the signal 324 such that the resulting device input signal 208 has a particular level or type(s) of jitter. In various embodiments, the level and type(s) of jitter to be injected into the device input signal 208 may be determined based on predetermined measurement conditions for a particular measurement (e.g., receiver input jitter tolerance) of the DUT 210. For example, jitter tolerance is a widely used measurement technique to predict the overall performance of a receiver. Jitter tolerance determines the maximum amount of jitter that can be presented at the receiver input without causing the receiver to incorrectly interpret the incoming data. Some high-speed protocols/standards, such as XAUI and PCI Express, specify a maximum amount of jitter that may be present and therefore must be tolerated by receivers. Such protocols/standards may specify individual tolerances for different types of jitter, such as random jitter (RJ), sinusoidal jitter (SJ) or periodic jitter (PJ), duty cycle distortion (DCD), inter-symbol interference (ISI), and/or bounded uncorrelated jitter (BUJ). Some protocols may also specify different jitter tolerances for various frequency ranges (e.g., jitter tolerance mask). The predetermined measurement conditions (e.g., levels and types of jitter) may be determined based on particular protocols/standards.

In the illustrated example of FIG. 3, the jitter injection unit 326 includes an arbitrary waveform generator (AWG) 330 connected to a delay unit 328 (e.g., a delay unit on a test board) for injecting SJ to the device input signal 208. In some examples, the jitter injection unit 326 may include other jitter injection devices to inject other types of jitter.

Figure 4:
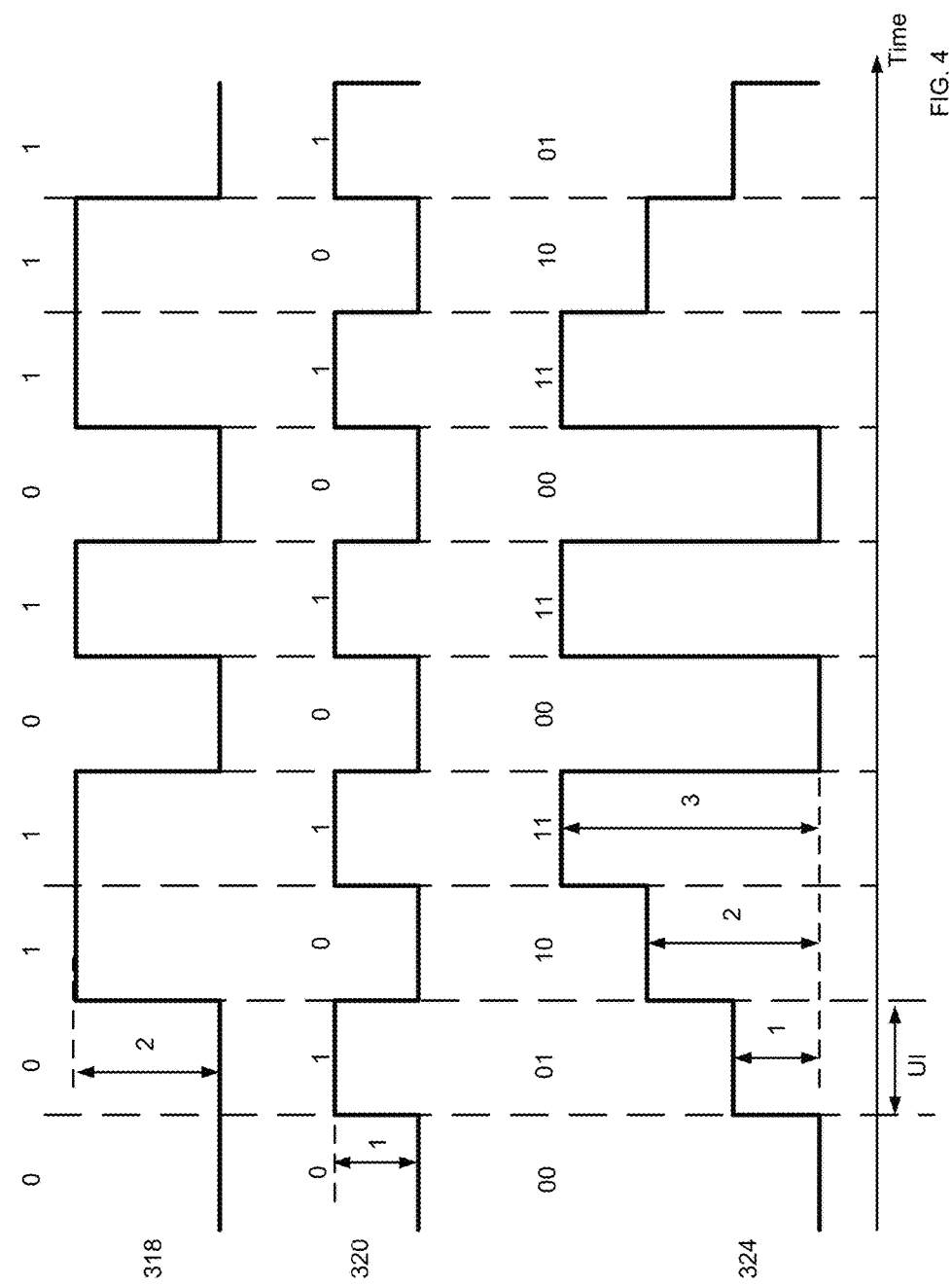
FIG. 4 is a timing diagram illustrating waveforms of signals of a signal generator according to some embodiments of the present disclosure.

Referring to FIG. 4, illustrated therein are waveforms of signals 318, 320, and 324 of the signal generator 204 of FIG.

3. The signal 318 is a two-level NRZ signal having two discrete amplitudes having normalized amplitude levels of zero and two. The signal 318 includes a sequence of single-bit symbols having corresponding logic values of 0, 0, 1, 1, 0, 1, 0, 1, 1, and 1. The signal 320 is a two-level NRZ signal having two discrete amplitudes having normalized amplitude levels of zero and one. As such, the signal 318 and signal 320 have an amplitude ratio of 2:1. The signal 320 includes a sequence of single-bit symbols having corresponding logic values of 0, 1, 0, 1, 0, 1, 0, 1, 0, and 1. The signal 324 is a four-level PAM signal having four discrete amplitudes having normalized amplitude levels of zero, one, two, and three. The signal 324 includes a sequence of two-bit symbols having corresponding logical values of 00, 01, 10, 11, 00, 11, 00, 11, 10, and 01. As illustrated in FIG. 4, because the signal 324 is a power sum of the signals 318 and 320, and signals 318 and 320 have an amplitude ratio of 2:1, the single-bit symbols of signal 318 and 320 correspond to the MSB and LSB of the two-bit symbols of the signal 324 respectively.

Referring to FIGS. 5 and 6, illustrated are eye diagrams of signals 324 and 208 respectively. As illustrated in FIG. 5, the PAM-4 signal 324 has a relatively small jitter 502. Referring to FIG. 6, after jitter is injected to the signal 324 by the jitter injection unit 326, the resulting device input signal 208 has a jitter 602 that is much greater than the jitter 502 (e.g., by more than about 300%). In the example of FIGS. 5 and 6, the jitter 502 is about 10% of the unit interval (UI), while the jitter 602 is about 40% of the UI.

Figure 7:
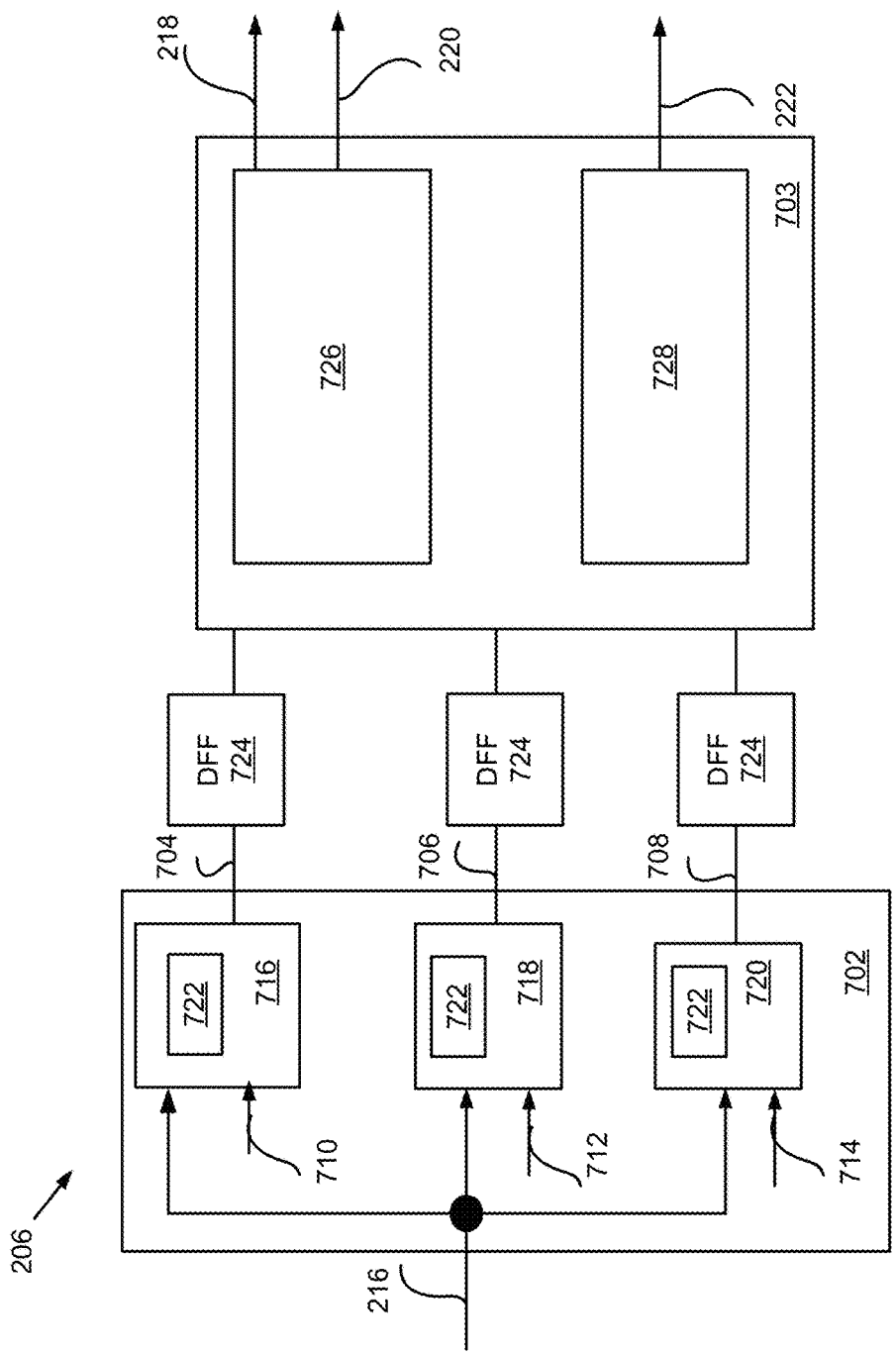
FIG. 7 is a block diagram illustrating an exemplary signal detector of a characterization system according to some embodiments of the present disclosure.

Referring to FIG. 7, illustrated is an exemplary signal detector 206. The signal detector 206 includes a conversion unit 702 and a conversion unit 703 coupled to the conversion unit 702. The conversion unit 702 receives the device output signal 216 from the DUT 210, and converts the device output signal 216 to detected signals 704, 706, and 708 based on threshold amplitudes 710, 712, and 714 of the PAM-4 device output signal 216. In an example, the PAM-4 device output signal 216 includes four possible discrete pulse amplitudes including normalized amplitude levels 0, 1, 2, and 3. In that example, the threshold amplitudes 710, 712, and 714 have normalized amplitude levels 2.25, 1.5, and 0.75 respectively. In another example where the possible discrete pulse amplitudes in the PAM-4 device output signal 216 are not evenly distributed, the threshold amplitudes 710, 712, and 714 may not be evenly distributed. In yet another example, the device output signal 216 has the same possible discrete pulse amplitudes as those of the device input signal 208, which are determined by the amplitudes of signals 309 and 310. As such, in that example, the threshold amplitudes 710, 712, and 714 may be determined based on the amplitudes of the signals 309 and 310 of the signal generator 204.

In the example of FIG. 7, in the conversion unit 702, N−1 decoders are used to generate N−1 signals for the PAM-N device output signal 216. For example, a decoder 716 of the conversion unit 702 receives a threshold amplitude 710 (e.g., having a normalized amplitude level of 2.25), and generates the detected signal 704 based on the threshold amplitude 710. The detected signal 704 is an NRZ signal. A symbol of the detected signal 704 has a logic value of "1" where the corresponding two-bit symbol in the PAM-4 device output signal 216 has a pulse amplitude greater than the threshold amplitude 710, and has a logic value of "0" where that two-bit symbol has a pulse amplitude less than the threshold amplitude 710. Similarly, the decoders 718 and 720 generate detected signals 704 and 706 based on the threshold amplitudes 712 and 714 respectively. The detected signal 706 is an NRZ signal. A symbol of the detected signal 706 has a logic value of "1" where the corresponding two-bit symbol in the PAM-4 device output signal 216 has a pulse amplitude greater than the threshold amplitude 712, and has a logic value of "0" where that two-bit symbol has a pulse amplitude less than the threshold amplitude 712. The detected signal D3 714 is an NRZ signal. A symbol of the detected signal 708 has a logic value of "1" where the corresponding two-bit symbol in the PAM-4 device output signal 216 has a pulse amplitude greater than the threshold amplitude 714, and has a logic value of "0" where that two-bit symbol has a pulse amplitude less than the threshold amplitude 714.

Figure 8:
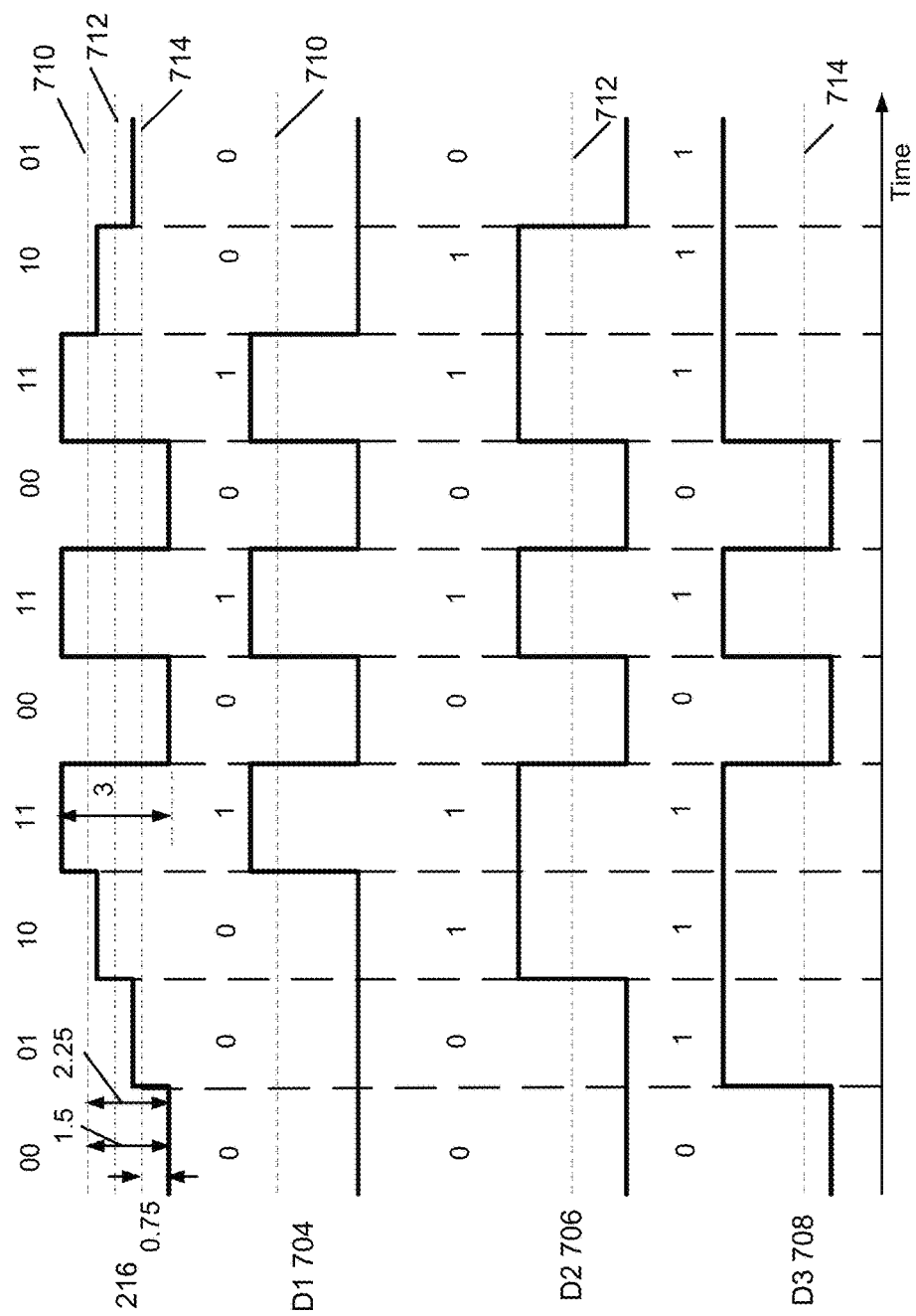
FIG. 8 is a timing diagram illustrating waveforms of signals of a signal detector according to some embodiments of the present disclosure.

Referring to FIG. 8, illustrated therein are waveforms of signals 216, and 704, 706, and 708 of the conversion unit 702 of the signal detector 206 of FIG. 7. The signal 216 is a four-level PAM signal includes a sequence of two-bit symbols having corresponding logical values of 00, 01, 10, 11, 00, 11, 00, 11, 10, and 01. Each of the signals 704, 706, and 708 is a two-level NRZ signal having two discrete amplitudes having normalized amplitude levels of zero and three. The signal 704 is generated based on the threshold amplitude 710, and includes a sequence of single-bit symbols having corresponding logic values of 0, 0, 0, 1, 0, 1, 0, 1, 0, and 0. The signal 706 is generated based on the threshold amplitude 712, and includes a sequence of single-bit symbols having corresponding logic values of 0, 0, 1, 1, 0, 1, 0, 1, 1, and 0. The signal 708 is generated based on the threshold amplitude 714, and includes a sequence of single-bit symbols having corresponding logic values of 0, 1, 1, 1, 0, 1, 0, 1, 1, and 1.

In some embodiments, the signal detector 206 and the analysis unit 224 may measure the quality of the DUT output signal 216 by changing the threshold amplitudes 710, 712 and 714. For example, vertical openings of the eye diagram of the DUT output signal 216 may be measured by biasing the threshold amplitudes 710, 712 and 714.

Referring back to FIG. 7, in some embodiments, to minimize reflection, the signal detector 206 has an overall equivalent termination impedance $R_E$ that matches with the termination impedance $R_{DUT}$ of the DUT 210. In an example, the overall equivalent termination impedance $R_E$ may be tuned by adjusting the termination impedances $R_{716}$, $R_{718}$, and $R_{720}$ of the decoders 716, 718, and 720 respectively. The relationship between the termination impedances may be expressed as follows:

$$\frac{1}{R_E} = \frac{1}{R_{716}} + \frac{1}{R_{718}} + \frac{1}{R_{720}} = \frac{1}{R_{DUT}}.$$

In the example of FIG. 7, each of the decoders 716, 718, and 720 includes a resistance calibration unit 722, which may be used to adjust the termination impedance of the corresponding decoder, thereby adjusting the termination impedance $R_E$ of the signal detector 206 such that it matches the termination impedance $R_{DUT}$ of the DUT 210.

In some embodiments, the decoders 716, 718, and 720 are located on different dies. For example, the decoders 716, 718, and 720 are NRZ receivers located in different dies. In an example, the resistance calibration units 722 may be resistance calibration units of the NRZ receivers 716, 718, and 720. In such examples, a resistance calibration unit 722 is located on the same die as the corresponding NRZ receiver. In some examples, the terminal impedances of the NRZ receivers 716, 718, and 720 may be adjusted using software attributes (e.g., "RCAL") in an NRZ receiver.

However, in another example, the resistance calibration unit 722 and the other portion of the corresponding decoder may be located in different dies.

In some embodiments, the detected signals 704, 706, and 708 are sent to a conversion unit 703 (e.g., using D-type flip-flops (DFFs) 724). In some embodiments, the signal detector 206 and the analysis unit 224 may measure quality of the DUT output signal 216 by adjusting a time delay of a clock to the DFFs 724. For example, by adding various time delays to the clock to the DFFs 724, the horizontal opening of the eye diagram of the DUT output signal 216 may be measured.

In various embodiments, the conversion unit 703 may include different logic units for generating various types of signals associated with detected signals 704, 706, and 708. In the example of FIG. 7, the conversion unit 703 includes logic units 726 and 728. As described in detail below, the logic units 726 may generate data signals associated with the detected signals 704, 706, and 708. The logic unit 728 may generate error indication signals associated with the detected signals 704, 706, and 708.

Figure 9:
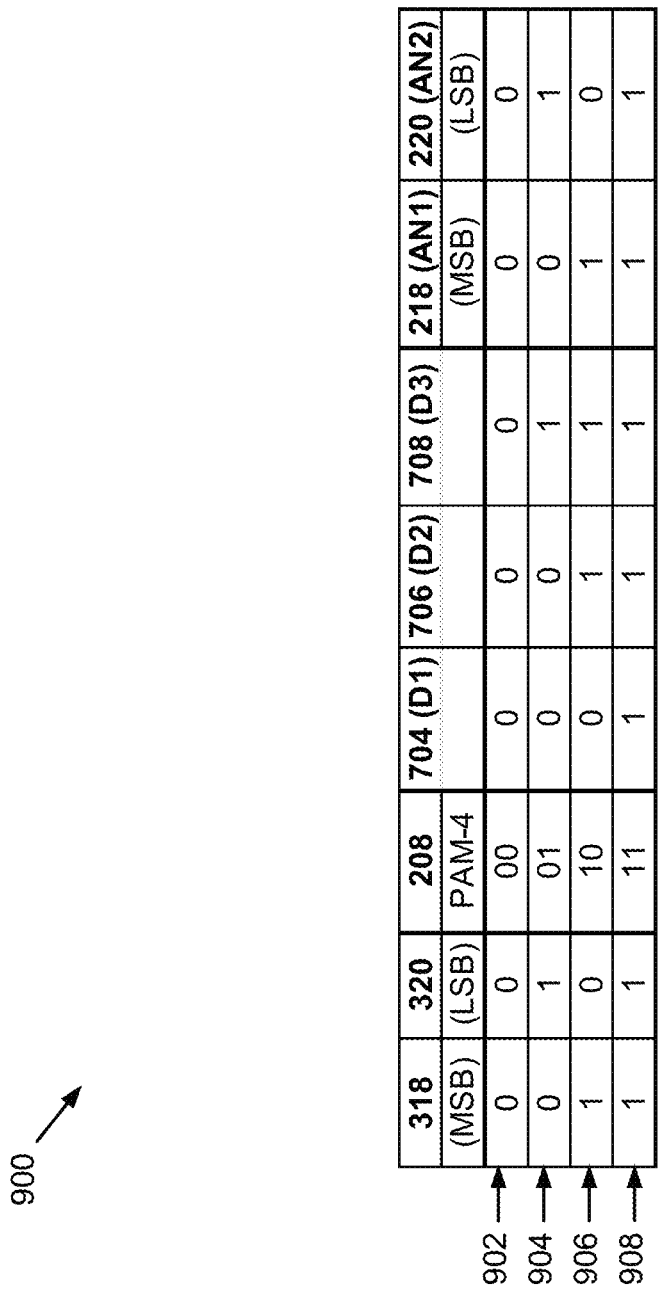
FIG. 9 illustrates a truth table for signals of a characterization system according to some embodiments of the present disclosure.

Referring to FIGS. 7 and 9, in some embodiments, the logic unit 726 receives the detected signals 704, 706, and 708, and generates data signals 218 and 220 based on the logic values of the symbols in detected signals 704, 706, and 708. In an example, the logic unit 726 generates the data signals 218 and 220 based on a truth table 900 of FIG. 9. As shown in the truth table 900, the sub-generators 302 and 304 generate NRZ signals 318 and 320, where are combined to generate a PAM-4 signal 208. Rows 902, 904, 906, and 908 provide the valid combinations of logic values of corresponding symbols in detected signals 704, 706, and 708. For example, the row 906 provides that for a two-bit symbol in the PAM-4 signal 208 having logic values "10," the corresponding logic values of symbols in signals 704, 706, and 708 are "0," "1," and "1" respectively. As such, the logic value of a corresponding symbol in the signal 218 that is provided to the analyzer 226 has a logic value of "1," which matches the logic value of the corresponding symbol in the NRZ signal 318. The logic value of a corresponding symbol in the signal 220 that is provided to the analyzer 228 has a logic value of "0," which matches the logic value of the corresponding symbol in the NRZ signal 320. The relationships between the logic values of symbols in signals 704, 706, and 708 (denoted as D1, D2, and D3 respectively) and the logic values of symbols in signals 218 and 220 (denoted as AN1 and AN2 respectively) may be expressed as follows:

$$AN1=D2; \quad (1)$$

$$AN2=\overline{D1\overline{D2}}D3+D1D2D3=(\overline{D1\overline{D2}}+D1D2)D3. \quad (2)$$

In some embodiments, a first data pattern (e.g., a data pattern as illustrated by the signal 318 of FIG. 4) is provided to both the sub-generator 302 and the analyzer 226. The sub-generator 302 then generates the signal 318 having that first data pattern. The analyzer 226 may compare the data pattern of the data signal 218 with that first data pattern to determine errors in the data signal 218 and generate BER for the data signal 218. Similarly, a second data pattern (e.g., a data pattern as illustrated by the signal 328 of FIG. 4) is provided to both the sub-generator 304 and the analyzer 228. The sub-generator 304 then generates the signal 320 having that second data pattern. The analyzer 228 may compare the data pattern of the data signal 220 with that second data pattern to determine errors in the data signal 220 and generate BER for the data signal 220. In some embodiments, the BERs for the data signals 218 and 220 may be consolidated to provide a BER of the DUT output signal 216.

Figure 10:
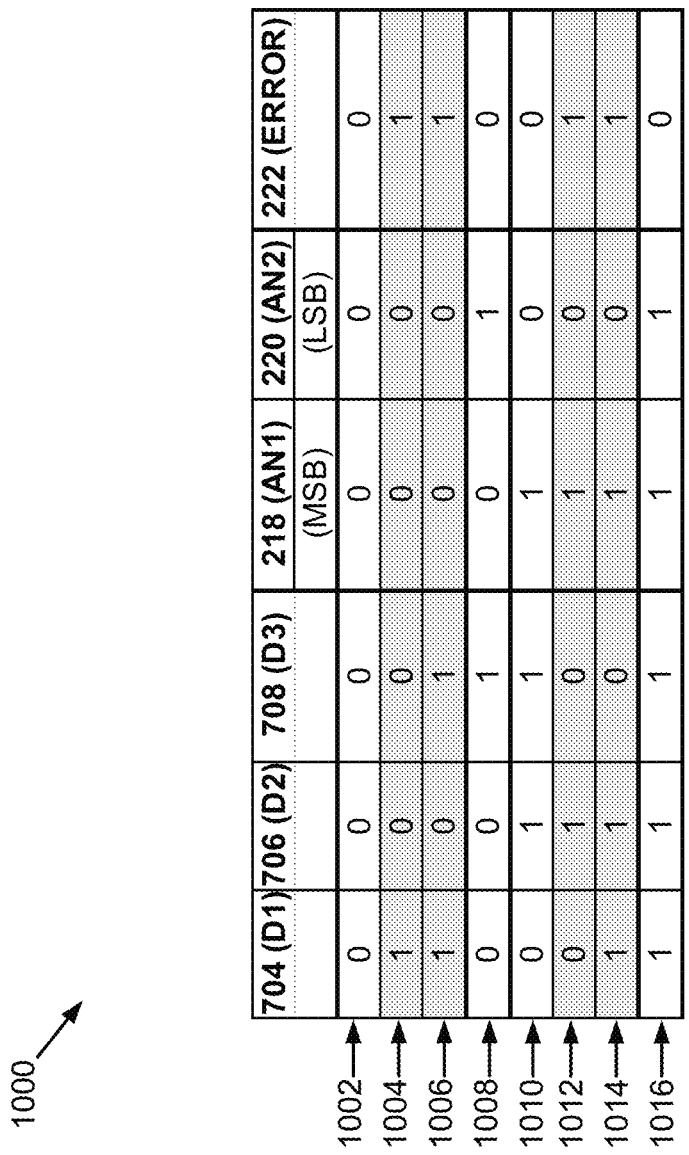
FIG. 10 illustrates a truth table for signals of a characterization system according to some embodiments of the present disclosure.

Referring to FIGS. 7 and 10, in some embodiments, a logic unit 728 receives the detected signals 704, 706, and 708, and generates the error indication signal 222 based on the logic values of the symbols in detected signals 704, 706, and 708. In an example, the logic unit 728 generates the error indication signal 222 based on a truth table 1000 of FIG. 10. As shown in the truth table 1000, rows 1002, 1008, 1010, and 1016 correspond to rows 902, 904, 906, and 908 of FIG. 9 respectively, which provide valid combinations of logic values of symbols in the detected signals 704, 706, and 708. On the other hand, rows 1004, 1006, 1010, 1012, and 1014 provide the invalid combinations of logic values of symbols in the detected signals 704, 706, and 708. Note that in an example, the logic unit 726 generates the signals 218 and 220 using equations (1) and (2) for both the valid and invalid combinations of logic values of symbols in the detected signals 704, 706, and 708. As such, an error indication signal 222 may provide error indication information to assist the analyzers in performing analysis processes using signals 218 and 220. The error indication signal 222 (denoted as ERROR) may be generated by the logic unit 728 based on the logic values of symbols in the detected signals 704, 706, and 708 as follows:

$$\text{ERROR}=D1\overline{D2}+D2\overline{D3},$$

where a value "1" of ERROR indicating that there is an error in the combination of data signals 218 and 220.

Figure 11:
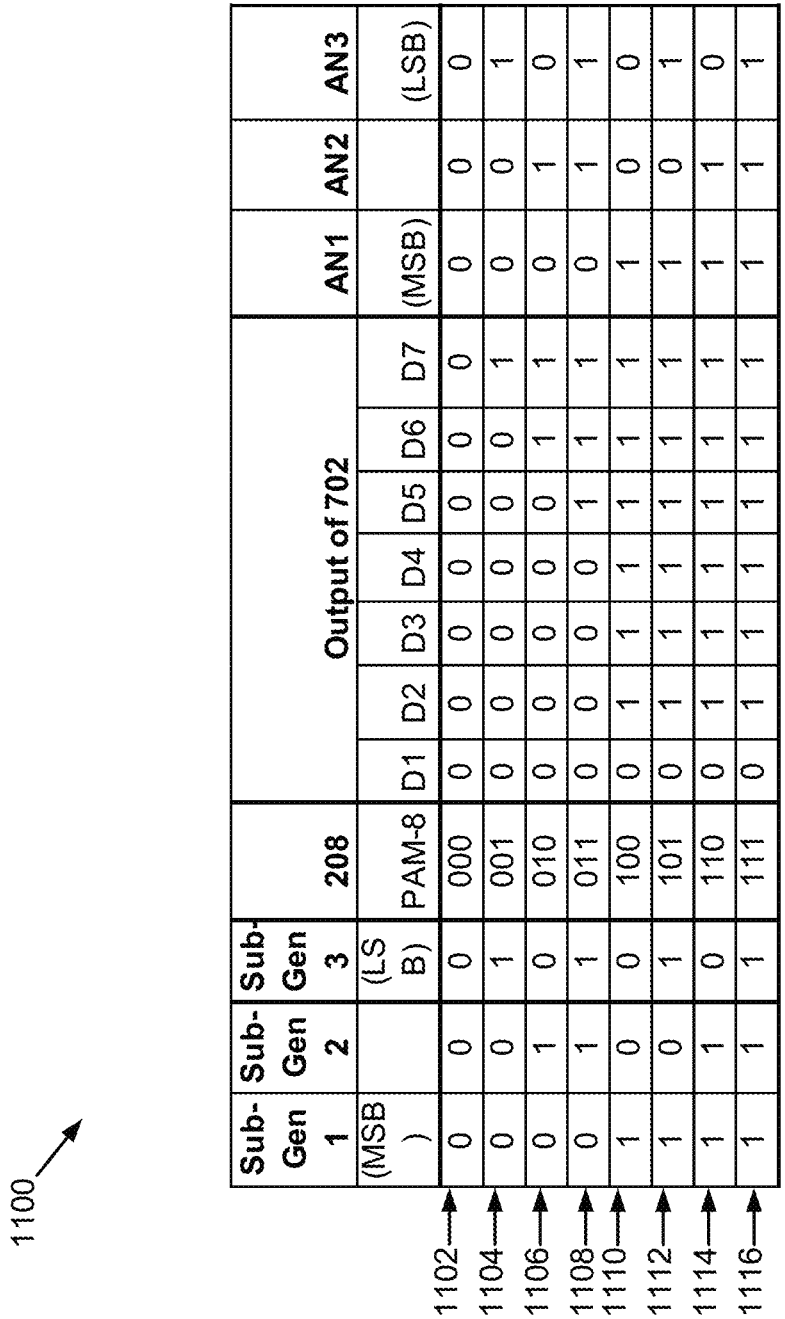
FIG. 11 illustrates a truth table for signals of a characterization system according to some embodiments of the present disclosure.

Referring to FIGS. 11 and 12, in various embodiments, the characterization system 202 may be configured to test a DUT 210 implementing a PAM-N encoding scheme, where is an integer greater than four.

Referring to FIG. 11, in some embodiments, in some embodiments, the signal generator 204 of the characterization system 202 includes P sub-generators each generating an NRZ signal, where P is an integer greater than two. For example, P may be three, four, or any suitable integer. Those NRZ signals are combined to generate a PAM-N device input signal 208. In such embodiments, the signal detector 206 of the characterization system 202 may provide P data signals corresponding to the M NRZ signals generated by the sub-generators respectively. FIG. 11 illustrates a truth table 1100 used by a characterization system 202 that is configured to test a PAM-8 DUT 210. As illustrated by rows 1102 through 1116 of the truth table 1100, the signal generator 204 of the characterization system 202 may include three sub-generators each generating an NRZ signal. The amplitude ratio among those NRZ signals may be 4:2:1. These three NRZ signals are combined to generate a PAM-8 device input signal 208. The conversion unit 702 may receive the PAM-8 device output signal 216, and generates seven detected signals (denoted by D1 through D7). A logic unit 726 of the conversion unit 703 may receive the detected signals D1 through D7, and generate three NRZ data signals (denoted by AN1, AN2, and AN3) for three analyzers of the analysis unit 224 according to the truth table 1100. In some examples, those NRZ data signals AN1, AN2, and AN3 correspond to the NRZ signals generated by the sub-generators of the signal generator 204.

Note that the truth table 1100 lists all the valid combinations of logic values of the corresponding symbols in the seven detected signals D1 through D7. In some examples, a logic unit 728 of the conversion unit 703 may receive the detected signals D1 through D7, and generate an error indication signal 222 indicating the error status of the combination of D1 through D7. In an example, the combination of D1 through D7 does not match one of the combinations provided by the truth table 1100. In that example, the corresponding symbol of the error indication signal 222 has a logic value "1." In another example, the combination of D1 through D7 matches one of the combinations provided by the truth table 1100. In that example, the corresponding symbol of the error indication signal 222 has a logic value "0."

Referring to FIG. 12, in some embodiments, the signal generator 204 of the characterization system 202 may include sub-generators generating signals having a different number of amplitude levels (e.g., a PAM-4 signal and an NRZ signal) for generating a PAM-N device input signal 208, where N is greater than two. Illustrated in FIG. 12 is a truth table 1200 used by a characterization system 202 that is configured to test a PAM-8 DUT 210. As illustrated by rows 1202 through 1216 of the truth table 1200, the signal generator 204 of the characterization system 202 may include a PAM-4 sub-generator generating a PAM-4 signal 318 and an NRZ signal 320. The PAM-4 signal 318 may include four discrete pulse amplitudes of normalized amplitude levels of 0, 2, 4, and 6. The NRZ signal 320 may include two discrete pulse amplitudes of normalized amplitude levels of 0 and 1. The PAM-4 signal 318 and an NRZ signal 320 are combined to generate a PAM-8 device input signal 208. In some embodiments, the signal detector 206 may be substantially the same as described above with reference to FIG. 11. For example, a logic unit 726 may generate three NRZ data signals (denoted by AN1, AN2, and AN3) for three analyzers of the analysis unit 224 according to the truth table 1200. The NRZ data signals AN1 and AN2 correspond to the PAM-4 signal 318, while the NRZ data signal AN3 correspond to the NRZ signal 320. Alternatively, in some embodiments, the logic unit 726 may generate a PAM-4 data signal and an NRZ data signal, and provide them two analyzers respectively. In such embodiments, the PAM-4 data signal corresponds to the PAM-4 signal 318, and the NRZ data signal corresponds to the NRZ signal 320.

It is noted that various configurations (e.g., N, P, amplitude ratios between the signals 309 and 310, the number and types of analyzers, the truth tables) illustrated in FIGS. 2, 3, 4, 5, 6, 7, 8, 9, 10, 11, and 12 are exemplary only and not intended to be limiting beyond what is specifically recited in the claims that follow. It will be understood by those skilled in that art in possession of this disclosure that other configurations may be used.

Various advantages may be present in various applications of the present disclosure. No particular advantage is required for all embodiments, and different embodiments may offer different advantages. One of the advantages of some embodiments is that by using NRZ signal generators and detectors in a characterization system for characterizing a PAM-N DUT, where N is an integer greater than two, the cost for characterizing a PAM-N DUT is reduced significantly. For example, low cost NRZ transmitters may be used in the NRZ signal generators, and low cost NRZ receivers may be used in the NRZ signal detectors. For further example, various blocks (e.g., a phase interpolator) in the NRZ transmitters may be used to control conditions (e.g., amplitudes, noise, jitter) of the signal provided to the PAM-N DUT. For further example, blocks (e.g., resistor calibration block) in the NRZ receivers may be used to control the equivalent terminal impedance of the signal detector based on the terminal impedance of the DUT to minimize reflection. Another advantage of some embodiments is that the characterization system may be implemented using different types of devices, including for example, FPGA devices and application specific integrated circuit (ASIC) devices. Yet another advantage of some embodiments is that logic units may be used to detect invalid combinations of logic values of the detected signals, which improves characterization accuracy.

Although particular embodiments have been shown and described, it will be understood that it is not intended to limit the claimed inventions to the preferred embodiments, and it will be obvious to those skilled in the art that various changes and modifications may be made without department from the spirit and scope of the claimed inventions. The specification and drawings are, accordingly, to be regarded in an illustrative rather than restrictive sense. The claimed inventions are intended to cover alternatives, modifications, and equivalents.

What is claimed is:

1. A characterization system, comprising:
a signal detector comprising:
a first conversion unit comprising circuitry configured to:
receive, from a first device, a first device output signal including N possible discrete pulse amplitudes, wherein N is an integer greater than two; and
generate a plurality of detected signals based on a plurality of threshold amplitudes respectively; and
a second conversion unit comprising circuitry configured to:
generate a first conversion output signal and a second conversion output signal based on logic values included in the plurality of detected signals,
wherein the first and second conversion output signals include M1 and M2 possible discrete pulse amplitudes respectively, and
wherein M1 and M2 are integers less than N; and
provide the first and second conversion output signals to an analysis unit for generating one or more measurements of the first device,
wherein the second conversion unit includes:
a validation unit comprising circuitry configured to generate an error indication signal indicating an error status of a combination of the logic values included in the plurality of detected signals, and
wherein the second conversion unit is configured to provide the error indication signal to the analysis unit.

2. The characterization system of claim 1, wherein the first conversion unit includes:
a first decoder configured to receive the first device output signal and a first threshold amplitude and generate a first detected signal;
a second decoder configured to receive the first device output signal and a second threshold amplitude and generate a second detected signal; and
a third decoder configured to receive the first device output signal and a third threshold amplitude and generate a third detected signal.

3. The characterization system of claim 2, wherein the signal detector is configured to have a first termination impedance matching a second termination impedance of the first device.

4. The characterization system of claim 2, further comprising:
a signal generator configured to provide, to the first device, a first device input signal including the N possible discrete pulse amplitudes, the signal generator including:

a first sub-generator configured to generate a first sub-generator output signal including M3 possible discrete pulse amplitudes;

a second sub-generator configured to generate a second sub-generator output signal including M4 possible discrete pulse amplitudes; and a combiner configured to receive the first and second sub-generator output signals and generate the first device input signal, wherein N is equal to or greater than a product of M3 and M4, wherein M3 and M4 are integers.

5. The characterization system of claim 4, wherein the first sub-generator, the second sub-generator, the first decoder, the second decoder, and the third decoder are located in a first die, a second die, a third die, a fourth die, and a fifth die respectively.

6. The characterization system of claim 4, where M3 is greater than M4.

7. The characterization system of claim 4, wherein the first sub-generator includes a first delay unit, wherein the first sub-generator output signal has a first amplitude weight, wherein the second sub-generator includes a second delay unit, wherein the second sub-generator output signal has a second amplitude weight, and wherein the first and second delay units and first and second amplitude weights are configured according to predetermined measurement conditions for the one or more measurements of the first device.

8. The characterization system of claim 1, wherein the signal detector is configured to:

provide the first conversion output signal to a first analyzer included in the analysis unit, wherein the first analyzer is configured to perform a first analysis process to generate a first measurement of the first device; and provide the second conversion output signal to a second analyzer included in the analysis unit, wherein the second analyzer is configured to perform a second analysis process to generate a second measurement of the first device.

9. A characterization system, comprising:

a signal detector comprising:

a first conversion unit comprising circuitry configured to:

receive, from a first device, a first device output signal including N possible discrete pulse amplitudes, wherein N is an integer greater than two, wherein the signal detector is configured to have a first termination impedance matching a second termination impedance of the first device; and generate a plurality of detected signals based on a plurality of threshold amplitudes respectively, wherein the first conversion unit includes:

a first decoder configured to receive the first device output signal and a first threshold amplitude and generate a first detected signal, wherein the first decoder includes a resistor calibration circuit configured to adjust a third termination resistance of the first decoder based on the second termination impedance;

a second decoder configured to receive the first device output signal and a second threshold amplitude and generate a second detected signal; and a third decoder configured to receive the first device output signal and a third threshold amplitude and generate a third detected signal; and a second conversion unit comprising circuitry configured to:

generate a first conversion output signal and a second conversion output signal based on logic values included in the plurality of detected signals, wherein the first and second conversion output signals include M1 and M2 possible discrete pulse amplitudes respectively, and wherein M1 and M2 are integers less than N; and provide the first and second conversion output signals to an analysis unit for generating one or more measurements of the first device.

10. A method, comprising:

receiving, by a signal detector from a first device, a first device output signal including N possible discrete pulse amplitudes, N being an integer equal to or greater than four;

generating a plurality of detected signals based on the first device output signal and a plurality of threshold amplitudes respectively;

generating a first conversion output signal and a second conversion output signal based on logic values included in the plurality of detected signals, wherein the first and second conversion output signal include M1 and M2 possible discrete pulse amplitudes respectively, M1 and M2 being integers less than N;

providing, by the signal detector to an analysis unit, the first and second conversion output signals, wherein the analysis unit generates one or more measurements of the first device using the first and second conversion output signals;

generating an error indication signal indicating an error status of a combination of the logic values included in the plurality of detected signals; and providing the error indication signal to the analysis unit.

11. The method of claim 10, further comprising:

generating, by a first decoder included in the signal detector, a first detected signal using the first device output signal and a first threshold amplitude;

generating, by a second decoder included in the signal detector, a second detected signal using the first device output signal and a second threshold amplitude; and generating, by a third decoder included in the signal detector, a third detected signal using the first device output signal and a third threshold amplitude.

12. The method of claim 11, further comprising:

configuring a first termination impedance of the signal detector such that the first termination impedance matches a second termination impedance of the first device.

13. The method of claim 12, wherein the configuring the first termination impedance of the signal detector includes:

configuring a third termination resistance of the first decoder using a resistor calibration circuit included in the first decoder.

14. The method of claim 10, further comprising:

generating, by a first sub-generator, a first sub-generator output signal including M3 possible discrete pulse amplitudes;

generating, by a second sub-generator, a second sub-generator output signal including M4 possible discrete pulse amplitudes;

generating a first device input signal including the N possible discrete pulse amplitudes by performing a power summation to the first and second sub-generator output signals; and providing the first device input signal to the first device, wherein N is equal to or greater than a product of M3 and M4.

15. The method of claim 14, wherein M1 equals M3, and wherein M2 equals M4.

16. The method of claim 14, further comprising: configuring a first amplitude weight of the first sub-generator output signal and a second amplitude weight of the second sub-generator output signal according to predetermined measurement conditions for the one or more measurements.

17. The method of claim 14, further comprising:
prior to providing the first device input signal to the first device, injecting a predetermined jitter to the first device input signal.

18. The method of claim 10, further comprising:
providing the first conversion output signal to a first analyzer included in the analysis unit, wherein the first analyzer is configured to perform a first analysis process to generate a first measurement of the first device; and providing the second conversion output signal to a second analyzer included in the analysis unit, wherein the second analyzer is configured to perform a second analysis process to generate a second measurement of the first device.

* * * * *